US010566864B2

(12) United States Patent
Firat et al.

(10) Patent No.: US 10,566,864 B2
(45) Date of Patent: Feb. 18, 2020

(54) MAGNET RETAINER FOR USE IN AN ELECTRIC MOTOR

(71) Applicant: ARCELIK ANONIM SIRKETI, Istanbul (TR)

(72) Inventors: Asuman Firat, Istanbul (TR); Emin Gultekin Sonmez, Istanbul (TR); Pevrul Sarikaya, Istanbul (TR); Gokhan Ergin, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/770,473

(22) PCT Filed: Nov. 6, 2015

(86) PCT No.: PCT/EP2015/075905
§ 371 (c)(1),
(2) Date: Apr. 23, 2018

(87) PCT Pub. No.: WO2017/076461
PCT Pub. Date: May 11, 2017

(65) Prior Publication Data
US 2019/0058366 A1 Feb. 21, 2019

(51) Int. Cl.
*H02K 1/27* (2006.01)
*H02K 1/28* (2006.01)

(52) U.S. Cl.
CPC ........ *H02K 1/2773* (2013.01); *H02K 1/278* (2013.01); *H02K 1/28* (2013.01)

(58) Field of Classification Search
CPC ........ H02K 1/2773; H02K 1/278; H02K 1/28
See application file for complete search history.

(56) References Cited

U.S. PATENT DOCUMENTS 10,033,235 B2 * 7/2018 Bouarroudj .......... H02K 1/2773
10,177,616 B2 * 1/2019 Ekin .................... H02K 1/2773
(Continued)

FOREIGN PATENT DOCUMENTS

DE 102010039334 A1 2/2012
JP H02119544 A 5/1990
(Continued)

OTHER PUBLICATIONS

International search report and written opinion, dated May 6, 2016, of International Application No. PCT/EP2015/075905; 8 pgs.

*Primary Examiner* — Anita M King
(74) *Attorney, Agent, or Firm* — Kilpatrick Townsend & Stockton LLP

(57) ABSTRACT

The present invention relates to a magnet retainer for use in a bldc motor of an electrical appliance. The bldc electric motor comprises a stator, a shaft and an inner magnet-rotor which comprises a core that includes a plurality of slots each for receiving a permanent magnet and a bore for press-fittingly receiving the shaft and a plurality of permanent magnets that are adapted to be respectively mounted into the slots. The magnet retainer of the present invention comprises a main body which is adapted for installation onto the core and a plurality of outer legs each disposed onto the main body and each adapted to be inserted into the respective slot, to resiliently press the respective permanent magnet radially outwards and to clamp the respective permanent magnet within the slot.

16 Claims, 8 Drawing Sheets

(56) References Cited

U.S. PATENT DOCUMENTS

Figure 1:
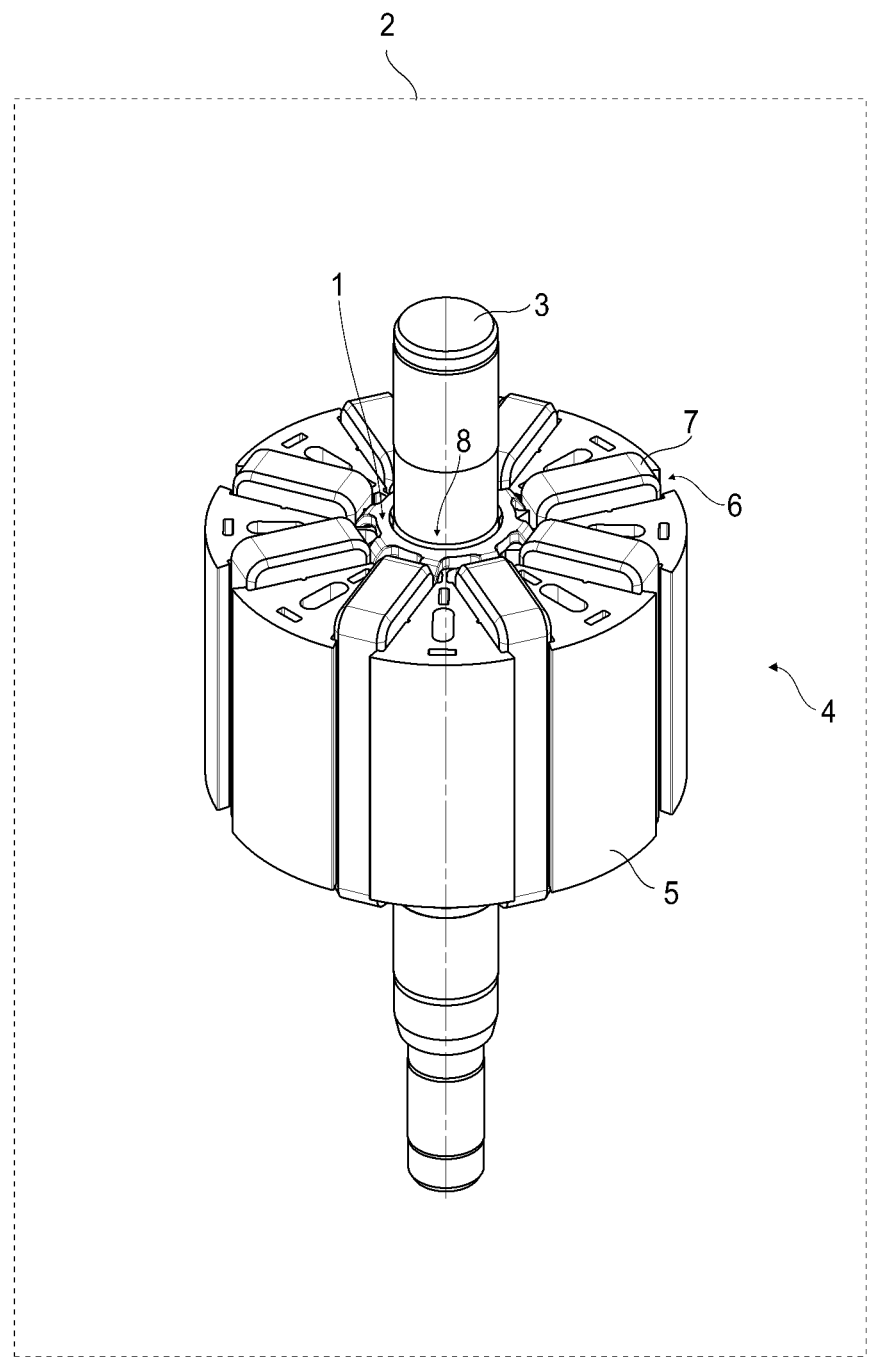

2013/0187506 A1* 7/2013 Lee ................... H02K 1/278
                                                    310/156.12
2013/0221787 A1* 8/2013 Kritharidou ............ H02K 1/17
                                                    310/154.14
2015/0303751 A1* 10/2015 Ekin .................... H02K 1/2773
                                                    310/43

FOREIGN PATENT DOCUMENTS

| WO | 03005531 A1 | 1/2003 |
| WO | 2012022731 A2 | 2/2012 |
| WO | 2014082839 A2 | 6/2014 |

* cited by examiner

MAGNET RETAINER FOR USE IN AN ELECTRIC MOTOR

RELATED APPLICATIONS

This application is a U.S. National Phase of International Application No. PCT/EP2015/075905, filed Nov. 6, 2015, the entire disclosure of which is incorporated by reference herein.

The present invention relates to a BLDC (Brushless Direct Current) electric motor of an electrical household appliance, in particular a hermetic refrigeration compressor which has a variable refrigeration capacity. The present invention more particularly relates to the inner magnet-rotor of the BLDC electric motor.

Hermetic refrigeration compressors with variable refrigeration capacities which are used in the refrigeration appliances such as domestic refrigerators are commonly known in the art. The variable capacity hermetic refrigeration compressor generally comprises a BLDC electric motor which includes a stator, a shaft and an inner magnet-rotor. The inner magnet-rotor comprises a core which includes a plurality of slots for respectively receiving a plurality of permanent magnets and a bore for press-fittingly receiving the shaft. The inner magnet-rotor further comprises a plurality of permanent magnets that are respectively mounted into the plurality of slots.

JPH02119544(A) discloses an inner magnet-rotor with permanent magnets.

A common problem with the aforementioned prior art inner magnet-motor is that the adjacent permanent magnets interact with each other during the assembly and become dislodged from their positions inside the slots. Particularly, in fully-automated production lines such incidents may give rise to manufacturing errors or other complications and may even cause the production line to halt. The dislodged permanent magnets generally reduce the quality of the bldc electric motor. In addition, there are incidents where the dislodged permanent magnets get stuck in the injection mold and cause the injection mold to receive damages. Moreover, reinserting or correcting the dislodged permanent magnets requires manual operation through the assembly operator, which however prolongs the production cycle.

An objective of the present invention is to provide a magnet retainer for use in a BLDC electric motor which solves the aforementioned problems of the prior art in a cost effective way and which enables an improved production, an improved assemblage and a reliable operation of the BLDC electric motor.

This objective has been achieved by the magnet retainer as defined in claim 1, the bldc electric motor as defined in claim 5 and the electrical household appliance as defined in claim 9. Further achievements have been attained by the subject-matters respectively defined in the dependent claims.

The magnet retainer of the present invention comprises a main body which is adapted for installation onto the core and a plurality of outer legs each disposed onto the main body and each adapted to be inserted into the respective slot, to resiliently press the respective permanent magnet radially outwards and to clamp the respective permanent magnet within the slot.

A major advantageous effect of the present invention is that permanent magnets can be securely maintained in their places within the slots throughout the automated production line and thus the risk of suffering any complications such as halting of the automated production line can be eliminated or reduced as much as possible. Thereby, the occurrence of any manufacturing errors and damaged injection molds can be eliminated or reduced as much as possible and thus the quality of the bldc electric motor can be increased. Thereby, also the amount of the manual operation can be decreased and thus the production cycle can be shortened and the production costs can be reduced. Another major advantageous effect of the present invention is that the need for using any adhesive so as to secure the permanent magnets in place within the slots has been obviated by virtue of the magnet retainer. Thereby, the production line can be protected from getting soiled through the adhesive and the production costs can be further reduced. Another major advantageous effect of the present invention is that the bldc electric motor can be more reliably operated event at comparatively higher ambient temperatures and rotational speeds by virtue of the magnet retainer. Another major advantageous effect of the present invention is that the price-performance ratio of the bldc electric motor can be improved by increasing the height of the permanent magnets relative to the height of the core without compromising the stability of the permanent magnets within the slots by virtue of the magnet retainer.

In an embodiment, the outer legs of the magnet retainer engage with the respective permanent magnets in addition to the clamping force through a releasable form-fitting connection. This releasable form-fitting connection may be provided in various forms such as projecting parts and recessed parts. In another embodiment the projecting part is provided as a nose whereas the recessed part is provided as an indent. The nose may be formed onto the outer leg or onto the permanent magnet. Accordingly, the indent may be formed onto the permanent magnet or onto the outer leg. These embodiments are particularly advantageous as the permanent magnets can be more securely kept in their places.

In other alternative embodiments, the magnet retainer is installed onto the core through a bonding attachment or alternatively through a releasable force-fitting attachment and/or a releasable form-fitting attachment. This releasable force-fitting attachment may be provided in various forms such as a clamping attachment. In another embodiment, the magnet retainer has inner legs which are each disposed onto the main body and which can be inserted into the bore and clamped between the core and the shaft. In addition, the releasable form-fitting attachment may also be provided in various forms such as such as projecting sections and recessed sections. In another embodiment, the recessed sections are provided as recesses which are formed into the inner surface of the bore whereas the projecting sections are defined through the facing sides of the inner legs. These embodiments are particularly advantageous as the magnet retainer can be securely installed onto the core.

In other alternative embodiments, the height of the core is equal to or less than a predetermined factor times the height of the permanent magnet. The predetermined factor is equal to or smaller than one. In another embodiment the predetermined factor is about 0.8. This embodiment is particularly advantageous as the price/performance ratio can be improved.

In this embodiment, the magnet retainer can securely keep the permanent magnets in their places within the slots even when the permanent magnets are higher than the core.

In another embodiment, the inner magnet-rotor is concealed with an overmolded cover through plastic injection molding. This embodiment is particularly advantageous as the inner magnet-rotor can be protected from ambient conditions.

In another embodiment, the magnet retainer is produced as a single piece from a non-magnetic material, preferably from plastic. This embodiment is particularly advantageous as the magnet retainer can be easily assembled with the inner-magnet rotor. Of course, the magnet retainer may be produced in two or more pieces which can be attached or bonded with each other.

In another embodiment, the overmolded cover and the magnet retainer are made from the same plastic material. This embodiment is particularly advantageous as the injection molding can be conducted smoothly.

In other alternative embodiments, the magnet retainer is used in an inner magnet-rotor or an outer-magnet-rotor of a corresponding bldc electric motor. The bldc electric motor of the present invention may be used in various electrical appliances, in particular in various electrical household appliances.

Figure 2:
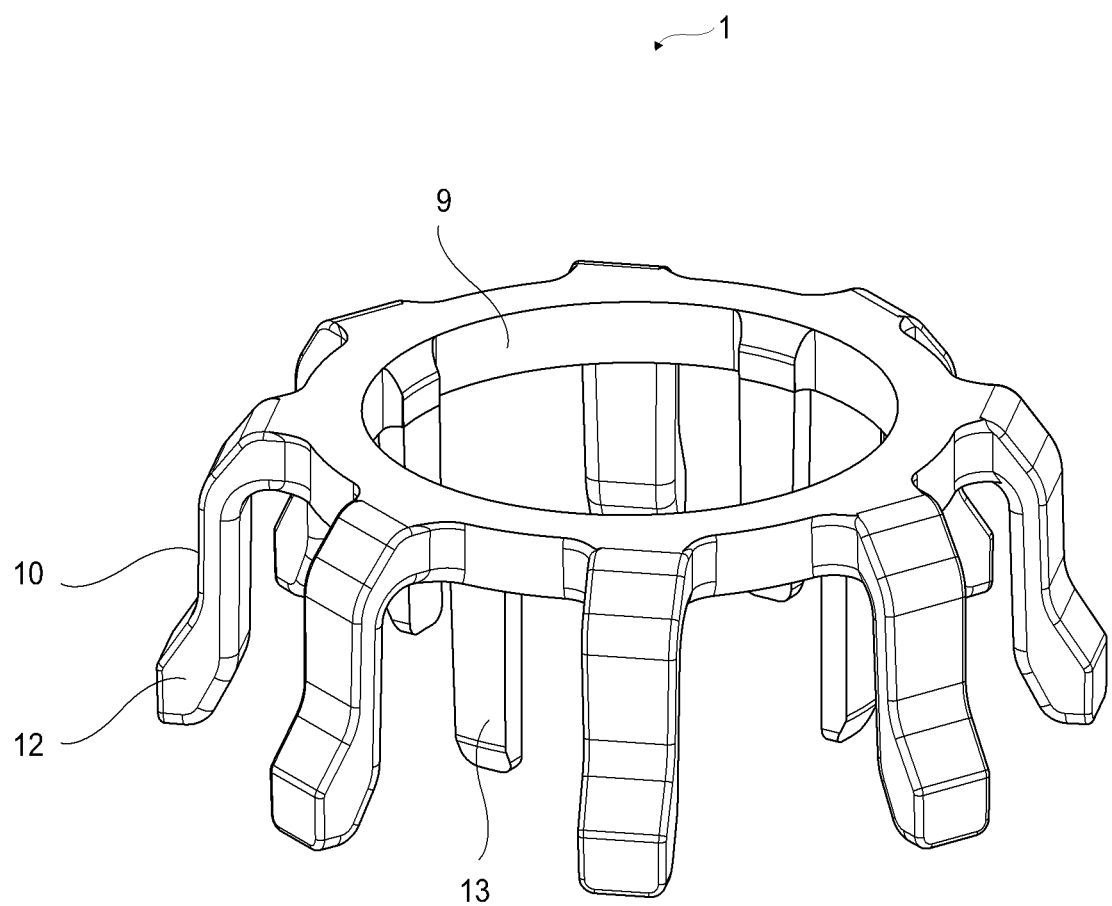
Figure 3:
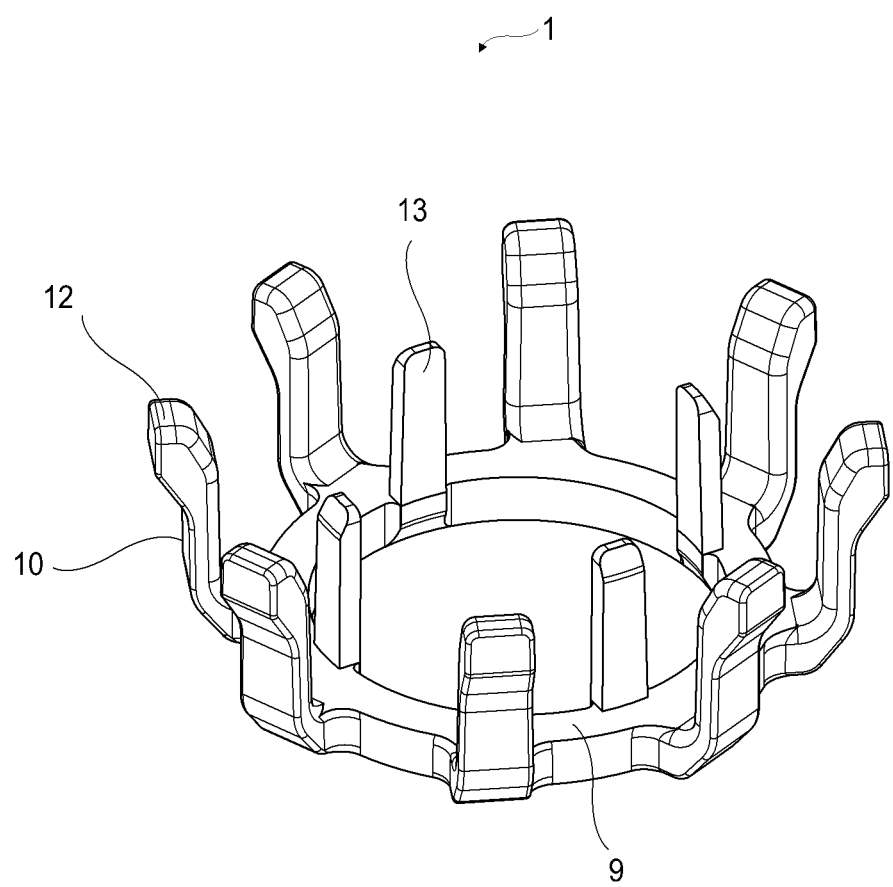
Figure 4:
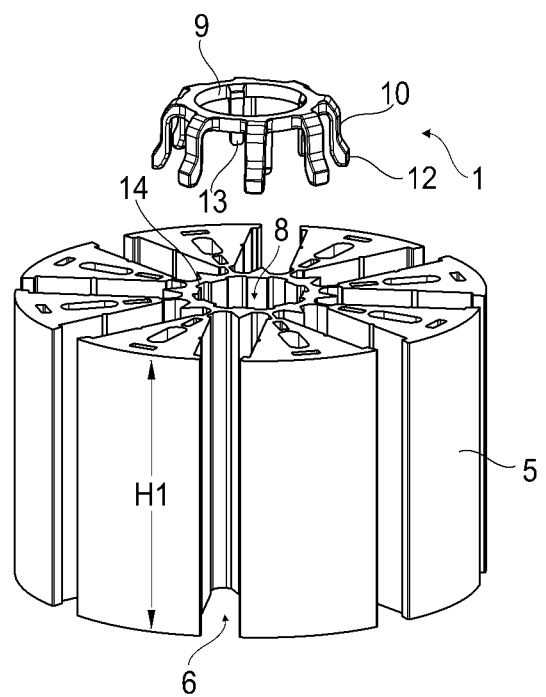
Figure 5:
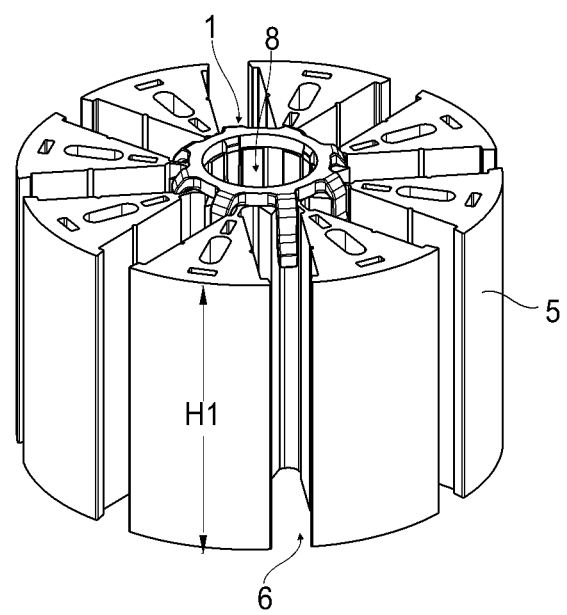
Figure 6:
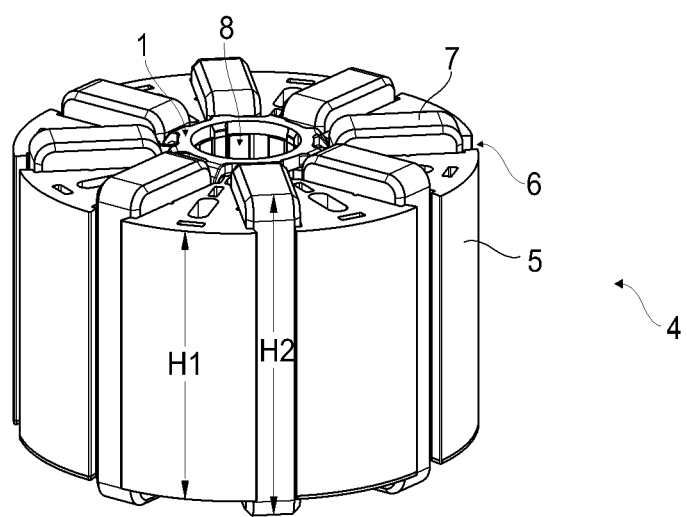
Figure 7:
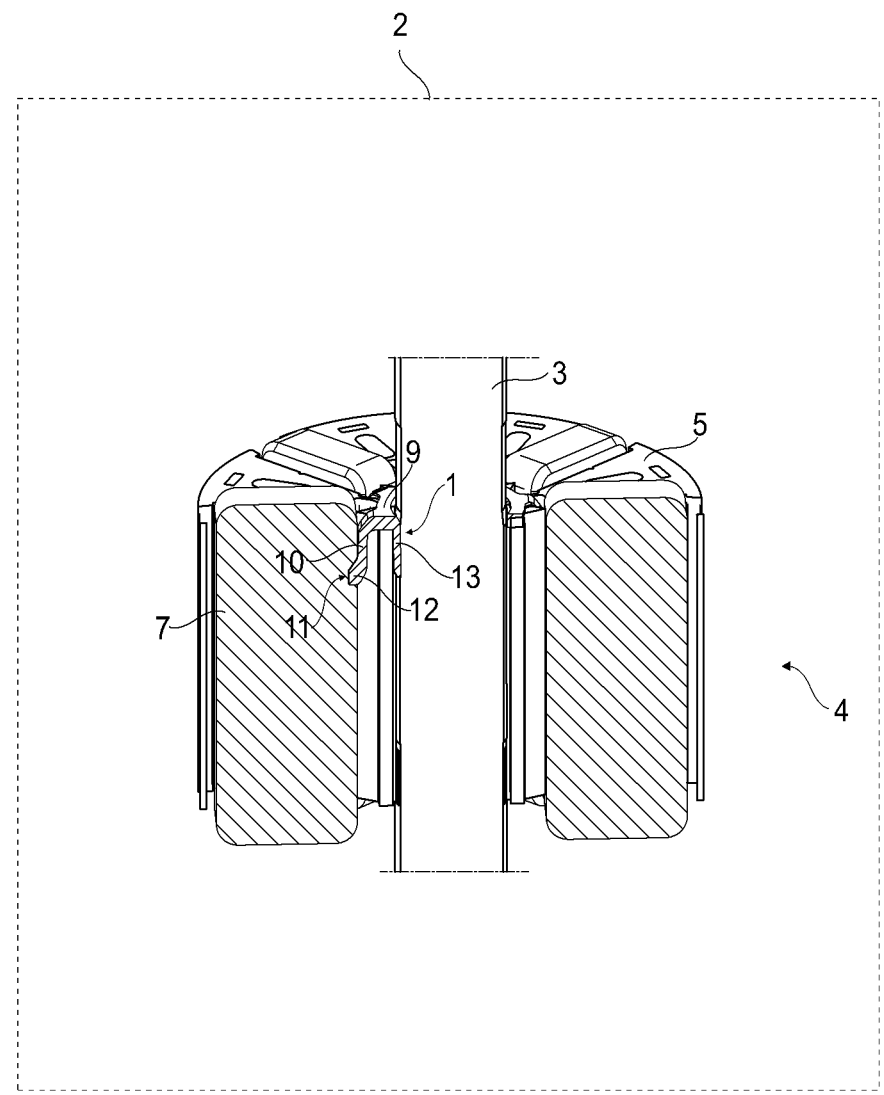
Figure 8:
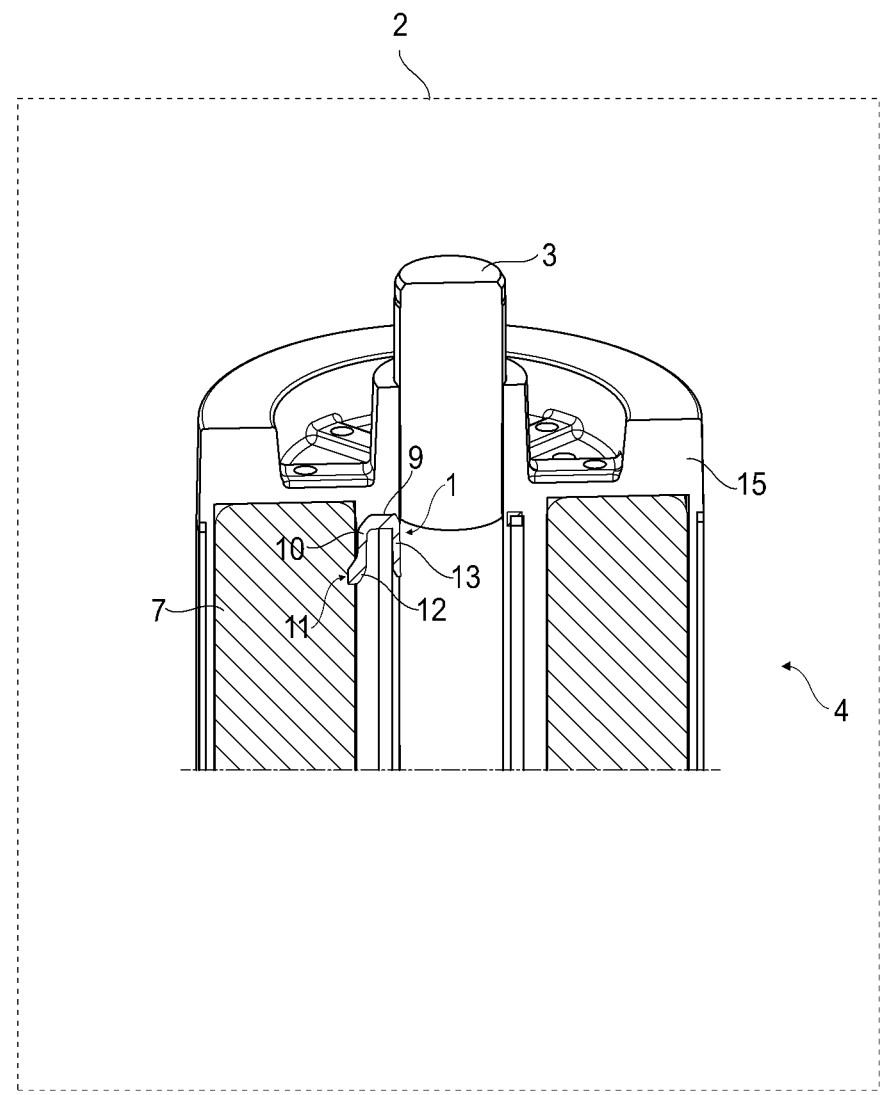

Additional features and additional advantageous effects of the magnet retainer and the bldc electric motor of the present invention will become more apparent with the detailed description of the embodiments with reference to the accompanying drawings in which:

FIG. 1—is a schematic partial perspective view of a brushless direct current electric motor which has a magnet retainer according to an embodiment of the present invention, prior to concealing the inner magnet-rotor with the overmolded cover and wherein the stator has been omitted for ease of illustration;

FIG. 2—is a schematic perspective view of a magnet retainer according to an embodiment of the present invention;

FIG. 3—is another schematic perspective view of the magnet retainer according to an embodiment of the present invention;

FIG. 4—is a schematic perspective view of the magnet retainer when being assembled with the core according to an embodiment of the present invention;

FIG. 5—is a schematic perspective view of the magnet retainer after having been assembled with the core according to an embodiment of the present invention;

FIG. 6—is a schematic perspective view of the magnet retainer after having been assembled with the core and the permanent magnets according to an embodiment of the present invention;

FIG. 7—is a schematic sectional partial view of the magnet retainer after having been assembled with the core, the permanent magnets and the shaft according to an embodiment of the present invention;

FIG. 8—is a schematic sectional partial view of the brushless direct current electric motor which has a magnet retainer according to an embodiment of the present invention, after the inner magnet-rotor has been concealed with the overmolded cover through plastic injection molding, wherein the stator has been omitted for ease of illustration.

The reference signs appearing on the drawings relate to the following technical features.
1. Magnet retainer
2. BLDC electric motor
3. Shaft
4. Inner magnet-rotor
5. Core
6. Slot
7. Permanent magnet
8. Bore
9. Main body
10. Outer leg
11. Indent
12. Nose
13. Inner leg
14. Recess
15. Overmolded cover
H1: Height of the core (5)
H2: Height of the permanent magnet (7)

The magnet retainer (1) is suitable for use in a brushless direct current electric motor (2) of an electrical household appliance (not shown).

The bldc electric motor (2) comprises a stator (not shown), a shaft (3) and an inner magnet-rotor (4). The inner magnet-rotor (4) comprises a core (5) that includes a plurality of slots (6) each for receiving a permanent magnet (7) and a bore (8) for press-fittingly receiving the shaft (3) and a plurality of permanent magnets (7) that are adapted to be respectively mounted into the slots (6) (FIG. 1).

The magnet retainer (1) of the present invention comprises a main body (9) which is adapted for installation onto the core (5) and a plurality of outer legs (10) each disposed onto the main body (9) and each adapted to be inserted into the respective slot (6), to resiliently press the respective permanent magnet (7) radially outwards and to clamp the respective permanent magnet (7) within the slot (6) (FIGS. 2 to 6).

The brushless direct current electric motor (2) of the present invention comprises the magnet retainer (1) (FIG. 1, FIG. 7 and FIG. 8).

The electrical household appliance (not shown) of the present invention comprises the bldc electric motor (2).

In an embodiment, the permanent magnet (7) has an indent (11). In this embodiment, each outer leg (10) of the magnet retainer (1) has a nose (12) which snap-fits into the indent (11) of the respective permanent magnet (7) (FIG. 7 and FIG. 8).

In another embodiment, the magnet retainer (1) further comprises a plurality of inner legs (13) each disposed onto the main body (9) and each adapted to be inserted into the bore (8) and to be clamped between the core (5) and the shaft (3) (FIG. 7 and FIG. 8).

In another embodiment, the inner magnet-rotor (4) has a plurality of recesses (14) which are formed into the inner surface of the bore (7). In this embodiment, each inner leg (13) of the magnet retainer (1) is adapted to be accommodated in the respective recess (14) (FIG. 4 and FIG. 5).

In another embodiment, the height (H1) of the core (5) is equal to or less than 0.8 times the height (H2) of each permanent magnet (7) (FIG. 6).

In another embodiment, the brushless direct current electric motor (2) further comprises an overmolded cover (15) which is made from plastic and which conceals the inner magnet-rotor (4) (FIG. 8).

In another embodiment, the magnet retainer (1) is produced as a single piece from a non-magnetic material, preferably from plastic.

In another embodiment, the overmolded cover (15) and the magnet retainer (1) are made from the same plastic material.

In another embodiment, the core (5) comprises a stack of laminations (not shown). The slots (6) are axially formed into the laminations.

In another embodiment, the main body (9) has an annular shape that fits around the shaft (3) (FIGS. 1 to 3). In this embodiment, the outer legs (10), including the noses (12) are disposed circumferentially onto the main body (9) so as to respectively face the permanent magnets (7) in accordance with the slots (6) in the core (5) (FIG. 7 and FIG. 8). The inner legs (13) are also disposed circumferentially onto the main body (9) so as to face the circumference of the shaft (3) (FIG. 7 and FIG. 8). In this embodiment, the magnet retainer (1) has a spider-like shape such that the outer legs (10) and the inner legs (13) extend axially downwards whereas the noses (12) extend radially outwards (FIG. 2).

In the subsequent description, a method of producing the bldc electric motor (2) will be briefly explained by way of example. First, the spider-like magnet retainer (1) is provided in accordance with the number of slots (6) and the shape of the core (5) (FIG. 2 and FIG. 3). Then, the core (5) is provided with the desired number of slots (6). The number of slots (6) may vary in accordance with the specific design of the bldc electric motor (2). Then the magnet retainer (1) is installed onto the core (5) (FIG. 4 and FIG. 5). Then, the permanent magnets (7) are provided, for example by way of magnetization and axially mounted into the slots (6) (FIG. 6). The spider-like magnet retainer (1) keeps the permanent magnets (7) in place within the slots (6) as the inner-magnet rotor (4) is transported along the production line (not shown). Then, the shaft (3) is press-fitted into the bore (8) of the core (5) (FIG. 7). Thereby, the spider-like magnet retainer (1) is immovably fixed to the core (5). The order of press-fitting the shaft (3) and mounting the permanent magnets (7) may be arbitrarily reversed. Thereafter, the inner magnet-rotor (4), including the magnet retainer (1) is placed into the injection mold (not shown) and concealed through plastic injection molding with an overmolded cover (15) (FIG. 8). The above described manufacturing steps can be conducted in an automated production line.

A major advantageous effect of the present invention is that permanent magnets (7) can be securely maintained in their places within the slots (6) throughout the automated production line and thus the risk of suffering any complications such as halting of the automated production line can be eliminated or reduced as much as possible. Thereby, the occurrence of any manufacturing errors and damaged injection molds can be eliminated or reduced as much as possible and thus the quality of the bldc electric motor (2) can be increased. Thereby, also the amount of manual operation can be decreased and thus the production cycle can be shortened and the production costs can be reduced. Another major advantageous effect of the present invention is that the need for using any adhesive so as to secure the permanent magnets (7) in place within the slots (6) has been obviated by virtue of the magnet retainer (1). Thereby, the production line can be protected from getting soiled through the adhesive and the production costs can be further reduced. Another major advantageous effect of the present invention is that the bldc electric motor (2) can be more reliably operated event at comparatively higher ambient temperatures and rotational speeds by virtue of the magnet retainer (1). Another major advantageous effect of the present invention is that the price-performance ratio of the bldc electric motor (2) can be improved by increasing the height (H2) of the permanent magnets (7) relative to the height (H1) of the core (5) without compromising the stability of the permanent magnets (7) within the slots (6) by virtue of the magnet retainer (1). Other advantageous effects of the present invention can be taken from the above described embodiments.

The invention claimed is:

1. A magnet retainer for use in a brushless direct current (bldc) electric motor of an electrical appliance, the bldc electric motor comprising a stator, a shaft and an inner magnet-rotor which comprises a core that includes a plurality of slots each for receiving a permanent magnet and a bore for press-fittingly receiving the shaft and a plurality of permanent magnets that are adapted to be respectively mounted into the slots, the magnet retainer comprising:
   a main body which is adapted for installation onto the core, and
   a plurality of outer legs each disposed onto the main body and each adapted to be inserted into the respective slot, to resiliently press the respective permanent magnet radially outwards and to clamp the respective permanent magnet within the slot,
   wherein each permanent magnet has an indent, and wherein each outer leg has a nose which snap-fits into the indent of the respective permanent magnet.

2. The magnet retainer according to claim 1, further comprising a plurality of inner legs each disposed onto the main body and each adapted to be inserted into the bore and to be clamped between the core and the shaft.

3. The magnet retainer according to claim 2, wherein the inner magnet-rotor has a plurality of recesses which are formed into an inner surface of the bore, wherein each inner leg of the magnet retainer is adapted to be accommodated in the respective recess.

4. A brushless direct current (bldc) electric motor for use in an electrical appliance, the bldc electric motor comprising:
   a stator,
   a shaft,
   an inner magnet-rotor which comprises:
      a core which includes a plurality of slots each for receiving a permanent magnet,
      a bore for press-fittingly receiving the shaft, and
      a plurality of permanent magnets that are adapted to be respectively mounted into the slots, and
   the magnet retainer as defined in claim 1.

5. The brushless direct current electric motor according to claim 4, wherein a height of the core is equal to or less than 0.8 times a height of each permanent magnet.

6. The brushless direct current electric motor according to claim 4, further comprises an overmolded cover which is made from plastic and conceals the inner magnet-rotor.

7. The brushless direct current electric motor according to claim 6, wherein the overmolded cover and the magnet retainer are made from a same plastic material.

8. An electrical household appliance comprising the bldc electric motor as defined in claim 4.

9. A magnet retainer for use in a brushless direct current (bldc) electric motor of an electrical appliance, the bldc electric motor comprising a stator, a shaft and an inner magnet-rotor which comprises a core that includes a plurality of slots each for receiving a permanent magnet and a bore for press-fittingly receiving the shaft and a plurality of permanent magnets that are adapted to be respectively mounted into the slots, the magnet retainer comprising:
   a main body which is adapted for installation onto the core;
   a plurality of outer legs each disposed onto the main body and each adapted to be inserted into the respective slot, to resiliently press the respective permanent magnet radially outwards and to clamp the respective permanent magnet within the slot; and
   a plurality of inner legs each disposed onto the main body and each adapted to be inserted into the bore and to be clamped between the core and the shaft.

10. The magnet retainer according to claim 9, wherein each permanent magnet has an indent, and wherein each outer leg has a nose which snap-fits into the indent of the respective permanent magnet.

11. The magnet retainer according to claim 9, wherein the inner magnet-rotor has a plurality of recesses which are formed into an inner surface of the bore, wherein each inner leg of the magnet retainer is adapted to be accommodated in the respective recess.

12. A brushless direct current (bldc) electric motor for use in an electrical appliance, the bldc electric motor comprising:
   a stator,
   a shaft,
   an inner magnet-rotor which comprises:
      a core which includes a plurality of slots each for receiving a permanent magnet,
      a bore for press-fittingly receiving the shaft, and
      a plurality of permanent magnets that are adapted to be respectively mounted into the slots, and
      the magnet retainer as defined in claim 9.

13. The brushless direct current electric motor according to claim 12, further comprises an overmolded cover which is made from plastic and conceals the inner magnet-rotor.

14. The brushless direct current electric motor according to claim 13, wherein the overmolded cover and the magnet retainer are made from a same plastic material.

15. An electrical household appliance comprising the bldc electric motor as defined in claim 12.

16. The brushless direct current electric motor according to claim 12, wherein a height of the core is equal to or less than 0.8 times a height of each permanent magnet.

* * * * *